United States Patent
Yang

(10) Patent No.: US 12,200,723 B2
(45) Date of Patent: Jan. 14, 2025

(54) SIDELINK DATA TRANSMISSION METHOD AND APPARATUS AND SIDELINK RESOURCE ALLOCATION METHOD AND APPARATUS

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 431 days.

(21) Appl. No.: 17/609,773

(22) PCT Filed: May 9, 2019

(86) PCT No.: PCT/CN2019/086268
§ 371 (c)(1),
(2) Date: Nov. 8, 2021

(87) PCT Pub. No.: WO2020/223969
PCT Pub. Date: Nov. 12, 2020

(65) Prior Publication Data
US 2022/0225391 A1    Jul. 14, 2022

(51) Int. Cl.
*H04W 72/04* (2023.01)
*H04W 4/00* (2018.01)
(Continued)

(52) U.S. Cl.
CPC ......... *H04W 72/23* (2023.01); *H04W 72/044* (2013.01); *H04W 72/54* (2023.01); *H04W 72/569* (2023.01)

(58) Field of Classification Search
None
See application file for complete search history.

(56) References Cited

U.S. PATENT DOCUMENTS

| 8,767,636 B2* | 7/2014 | Fan | H04W 8/04 370/395.42 |
| 2006/0034239 A1* | 2/2006 | Abeta | H04B 7/2618 370/437 |

(Continued)

FOREIGN PATENT DOCUMENTS

| CN | 108401528 A | 8/2018 |
| CN | 109150424 A | 1/2019 |

(Continued)

OTHER PUBLICATIONS

International Search Report of PCT Application No. PCT/CN2019/086268 dated Jan. 21, 2020 with English translation, (4p).

*Primary Examiner* — Sai Aung
(74) *Attorney, Agent, or Firm* — Arch & Lake LLP; Hao Tan; Sheng Wang

(57) ABSTRACT

A method, apparatus, and a non-transitory computer-readable storage medium for sidelink data transmission are provided. The method may be applied to a user equipment. The user equipment may receive allocation information transmitted by a base station. The allocation information instructs user equipment to transmit a second service type of data on a second time-frequency resource and contains priority information of the second service type of data. The user equipment may determine whether to transmit a first service type of data on a first time-frequency resource or transmit the second service type of data on the first time-frequency resource according to a priority of the first service type of data and a priority of the second service type of data if the first time-frequency resource is the same as the second time-frequency resource.

7 Claims, 6 Drawing Sheets

(51) Int. Cl.
  *H04W 28/02*      (2009.01)
  *H04W 72/044*     (2023.01)
  *H04W 72/23*      (2023.01)
  *H04W 72/54*      (2023.01)
  *H04W 72/566*     (2023.01)

(56) References Cited

U.S. PATENT DOCUMENTS

| | | | | |
|---|---|---|---|---|
| 2009/0154415 A1* | 6/2009 | Park | ............... | H04W 72/56 |
| | | | | 370/329 |
| 2017/0070388 A1* | 3/2017 | Xu | ............... | H04W 72/30 |
| 2018/0206260 A1 | 7/2018 | Khoryaev et al. | | |
| 2019/0200375 A1 | 6/2019 | Yasukawa et al. | | |
| 2020/0163083 A1* | 5/2020 | Yu | ............... | H04W 72/044 |
| 2020/0359403 A1* | 11/2020 | Lee | ............... | H04W 72/21 |

FOREIGN PATENT DOCUMENTS

| CN | 109565792 A | 4/2019 |
|---|---|---|
| CN | 109691146 A | 4/2019 |

\* cited by examiner

SIDELINK DATA TRANSMISSION METHOD AND APPARATUS AND SIDELINK RESOURCE ALLOCATION METHOD AND APPARATUS

CROSS-REFERENCE TO RELATED APPLICATION

This application is a national phase application based on PCT/CN2019/086268, filed on May 9, 2019, the content of which is incorporated herein by reference.

TECHNICAL FIELD

The disclosure relates to the technical field of communication, in particular to a sidelink data transmission method, a sidelink data transmission apparatus, a sidelink resource allocation method, a sidelink resource allocation apparatus, an electronic device and a computer readable storage medium.

BACKGROUND

Under a sidelink communication scenario, user equipment may perform communication on the basis of two communication modes, one of which performs communication according to a base station dynamically scheduled resource and the other one of which performs communication according to a self-selected resource.

In the related art, for example, under a sidelink communication scenario based on 4G, as for data of different service types, the user equipment adopts only one communication mode for communication due to a low requirement for quality of service (QoS).

SUMMARY

In view of this, the disclosure provides methods and apparatus for sidelink data transmission, and methods and apparatus for sidelink resource allocation.

According to a first aspect of the present disclosure, a method for sidelink data transmission is provided and is suitable for user equipment. The user equipment may receive allocation information transmitted by a base station. The allocation information is configured to indicate the user equipment to transmit a second service type of data on a second time-frequency resource and contains priority information of the second service type of data. The user equipment may also determine whether to transmit a first service type of data on a first time-frequency resource for transmitting the first service type of data or transmit the second service type of data on the first time-frequency resource according to a priority of the first service type of data and a priority of the second service type of data if the first time-frequency resource is the same as the second time-frequency resource.

According to a second aspect of the present disclosure, a method for sidelink resource allocation is provided and is suitable for a base station. The base station may generate allocation information according to information of a second time-frequency resource and priority information of the second time-frequency resource. The allocation information is configured to indicate user equipment to transmit a second service type of data according to a priority of the second service type of data. The base station may also transmit the allocation information to the user equipment.

According to a third aspect of the present disclosure, a computing device is provided. The computing device may include one or more processors, a non-transitory computer-readable memory storing instructions executable by the one or more processors. The one or more processors may be configured to receive allocation information transmitted by a base station. The allocation information is configured to indicate the user equipment to transmit a second service type of data on a second time-frequency resource and comprises priority information of the second service type of data. The one or more processors may further be configured to determine whether to transmit a first service type of data on a first time-frequency resource for transmitting the first service type of data or transmit the second service type of data on the first time-frequency resource according to a priority of the first service type of data and a priority of the second service type of data if the first time-frequency resource is the same as the second time-frequency resource.

BRIEF DESCRIPTION OF THE DRAWINGS

In order to describe the technical solutions in the examples of the disclosure more clearly, accompanying drawings needed in description of the examples will be briefly introduced below. Apparently, the drawings in the following description are only some examples of the disclosure, and those ordinarily skilled in the art can obtain other drawings according to these drawings without creative work.

DETAILED DESCRIPTION

The technical solutions in the examples of the disclosure will be described clearly and completely below with reference to the drawings of the disclosure. Apparently, the described examples are only some but not all of the examples of the disclosure. Based on the examples of the disclosure, all other examples obtained by those ordinarily skilled in the art without creative work fall in the protection scope of the disclosure.

Under a sidelink communication scenario based on 5G, as for the data of different service types, the user equipment needs to adopt different communication modes for communication due to a high requirement for QoS, which may cause the situation that a resource based on the first communication mode is the same as a resource based on the second communication mode, the user equipment cannot determine which service type of data is transmitted in which communication mode on the resource, and consequently data cannot be transmitted smoothly.

Figure 1:
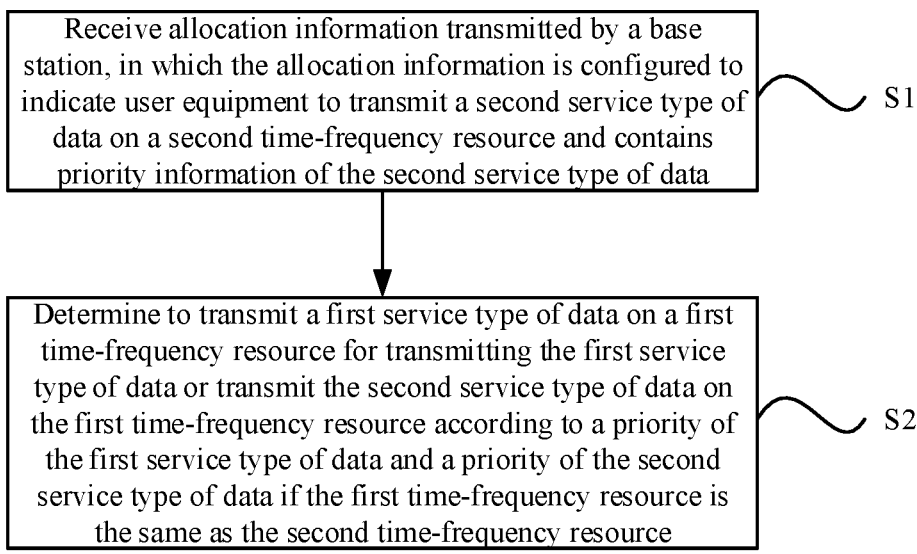
FIG. 1 is a schematic flowchart of a sidelink data transmission method shown according to an example of the disclosure.

FIG. 1 is a schematic flowchart of a sidelink data transmission method shown according to an example of the disclosure. The sidelink data transmission method shown by the example of the disclosure is suitable for user equipment. The user equipment may perform communication with other devices through a sidelink based on 5G new radio (NR), and the other devices include a base station and also include other user equipment. The user equipment may be, for example, a mobile phone, a tablet PC, a wearable device and other electronic devices.

As shown in FIG. 1, the sidelink data transmission method may include the following steps.

In step S1, allocation information transmitted by the base station is received. The allocation information is configured to indicate the user equipment to transmit a second service type of data on a second time-frequency resource, and the allocation information contains priority information of the second service type of data.

The base station may determine how to allocate the second time-frequency resource for a user according to a buffer status report (BSR) transmitted by the user equipment. The base station may generate the allocation information according to information of the second time-frequency resource after determining the second time-frequency resource. The allocation information is configured to indicate the user equipment to transmit the second service type of data on the second time-frequency resource.

In one example, the second time-frequency resource may occupy one or more symbols or one or more subframes in a time domain, and occupy one or more subcarriers (or sub-bandwidths) in a frequency domain.

In step S2, it is determined to transmit a first service type of data on a first time-frequency resource for transmitting the first service type of data or transmit the second service type of data on the first time-frequency resource according to a priority of the first service type of data and a priority of the second service type of data if the first time-frequency resource is the same as the second time-frequency resource.

In one example, if the second time-frequency resource is the same as the first time-frequency resource both in the frequency domain and the time domain in each period, it may be determined that the first time-frequency resource is the same as the second time-frequency resource, and if the second time-frequency resource is different from the first time-frequency resource in the frequency domain or the time domain in at least one period, it may be determined that the first time-frequency resource is different from the second time-frequency resource.

In one example, under the condition that the first time-frequency resource for transmitting the first service type of data by the user equipment is the same as the second time-frequency resource, the user equipment cannot transmit the first service type of data and the second service type of data separately on the different time-frequency resources, so that it may be determined to transmit the first service type of data on the first time-frequency resource or transmit the second service type of data on the first time-frequency resource according to the priority of the first service type of data and the priority of the second service type of data.

For example, the first service type of data is transmitted on the first time-frequency resource in response to the priority of the first service type of data being higher than the priority of the second service type of data, and the second service type of data is transmitted on the first time-frequency resource in response to the priority of the second service type of data being higher than the priority of the first service type of data. In other words, the user equipment may select to transmit a service type of data with a higher priority on the first time-frequency resource (namely, the second time-frequency resource) according to the priority of the first service type of data and the priority of the second service type of data, so that it is guaranteed that the service type of data with the higher priority may be transmitted preferentially, and a good communication effect is guaranteed.

The first service type and the second service type may not specifically refer to a certain service type but are used for representing two different service types, and a difference of the two service types means a difference of one or more requirements of the two service types. For example, time delay allowed by the first service type is lower than a time delay allowed by the second service type, namely, transmission urgency of the first service type of data is higher than that of the second service type of data, the first service type of data may be transmitted through the first time-frequency resource, and as the first time-frequency resource may be self-selected by the user equipment, compared with the second time-frequency resource allocated by the base station through the allocation information, the first time-frequency resource may be determined faster, so that transmission of the first service type of data may be completed faster, and a requirement of the first service type for time delay can be guaranteed advantageously.

Figure 2:
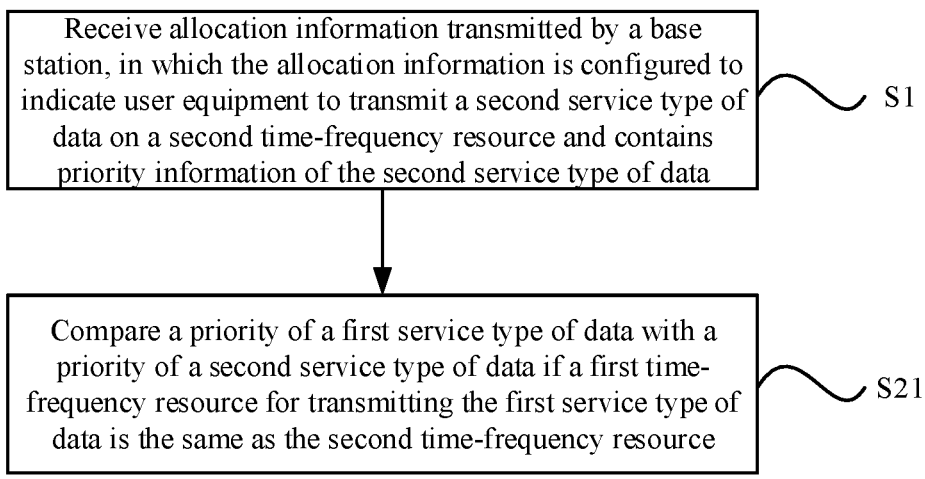
FIG. 2 is a schematic flowchart of another sidelink data transmission method shown according to an example of the disclosure.

FIG. 2 is a schematic flowchart of another sidelink data transmission method shown according to an example of the disclosure. As shown in FIG. 2, the step that it is determined to transmit the first service type of data on the first time-frequency resource or transmit the second service type of data on the first time-frequency resource according to the priority of the first service type of data and the priority of the second service type of data includes:

in step S21, the priority of the first service type of data is compared with the priority of the second service type of data.

In one example, the user equipment may self-determine the priority information of the first service type of data, so that the priority of the first service type of data may be compared with the priority of the second service type of data.

In step S22, the first service type of data is transmitted on the first time-frequency resource in response to the priority of the first service type of data being higher than the priority of the second service type of data, and the second service type of data is transmitted on the first time-frequency resource in response to the priority of the second service type of data being higher than the priority of the first service type of data.

In one example, the first service type of data is transmitted on the first time-frequency resource in response to the priority of the first service type of data being higher than the priority of the second service type of data, the second service type of data is transmitted on the first time-frequency resource in response to the priority of the second service type of data being higher than the priority of the first service type of data, in other words, the user equipment may select to transmit a service type of data with a higher priority on the first time-frequency resource according to a comparison result of the priority of the first service type of data and the priority of the second service type of data, so that it is guaranteed that the service type of data with the higher priority may be transmitted preferentially, and a good communication effect is guaranteed.

Figure 3:
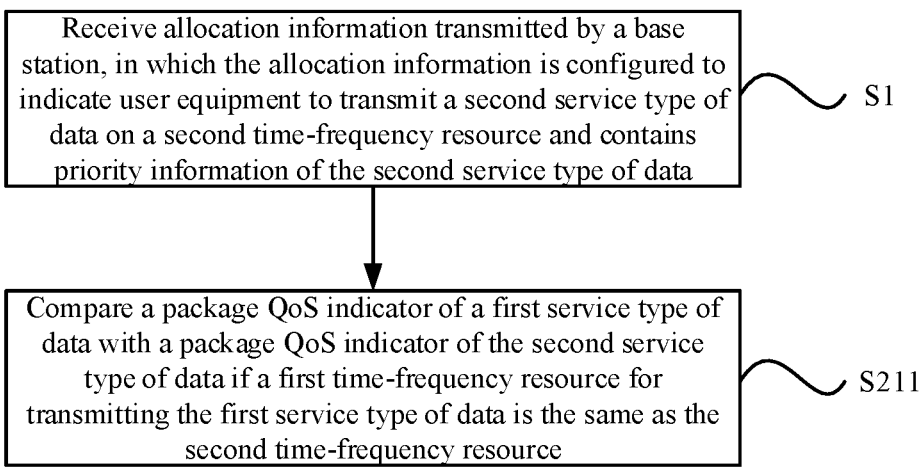
FIG. 3 is a schematic flowchart of yet another sidelink data transmission method shown according to an example of the disclosure.

FIG. 3 is a schematic flowchart of yet another sidelink data transmission method shown according to an example of the disclosure. As shown in FIG. 3, the step that the priority of the first service type of data is compared with the priority of the second service type of data includes:

in step S211, a package QoS indicator of the first service type of data is compared with a package QoS indicator of the second service type of data.

In one example, which of the priority of the first service type of data and the priority of the second service type of data is higher may be determined by comparing the package QoS indicator (PQI) and the package QoS indicator of the second service type of data, for example, a priority of a service type of data with a larger package QoS indicator is higher.

Specifically, if the first time-frequency resource is the same as the second time-frequency resource, for example, the package QoS indicator of the first service type of data is 2, the package QoS indicator of the second service type of data is 3, as 3 is larger than 2, it may be determined that the priority of the second service type of data is higher than the priority of the first service type of data, and then the second service type of data may be transmitted on the first time-frequency resource.

The allocation information carrying package QoS indicators may be downlink control information (DCI), for example, DCI-5 may be adopted.

As for the same service type of data, QoS of different data packages may be different, the different data packages may correspond to different package QoS indicators, so the priority of the first service type of data may be compared with the priority of the second service type of data by using data packages as granularity according to the package QoS indicators. Compared with the situation of always judging that a priority of a certain service type of data is higher than that of another service type of data by using a service type as granularity, the example may obtain different judgment results according to the different data packages of the first service type of data and the second service type of data, so that a priority of a service type of data can be determined more accurately.

Certainly, the priority of the first service type of data and the priority of the second service type of data may be set as required or determined according to service types. For example, a priority of a service type of data with lower allowed time delay is higher than that of a service type with higher allowed time delay. It needs to be noted that the priority of the service type of data may be determined according to other parameters as required besides the allowed time delay of the service type. A corresponding relation between the priority and the service type may be pre-configured to the user equipment by the base station, so that when the user equipment transmits the first service type of data, it may be determined that the first service type of data belongs to the first service type according to the corresponding relation, and then the priority of the first service type of data is determined.

Figure 4:
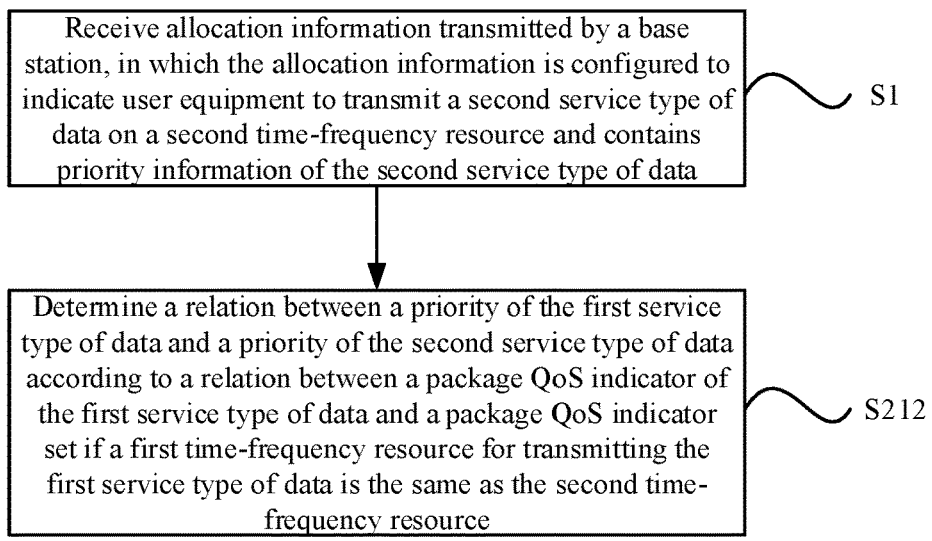
FIG. 4 is a schematic flowchart of yet another sidelink data transmission method shown according to an example of the disclosure.

FIG. 4 is a schematic flowchart of yet another sidelink data transmission method shown according to an example of the disclosure. As shown in FIG. 4, the priority information of the second service type of data contains a package QoS indicator set, and the step that the priority of the first service type of data is compared with the priority of the second service type of data includes:

in step S212, a relation between the priority of the first service type of data and the priority of the second service type of data is determined according to a relation between the package QoS indicator of the first service type of data and the package QoS indicator set.

In one example, the package QoS indicator set may be carried in the allocation information. The user equipment may determine which of the priority of the first service type of data and the priority of the second service type of data is higher according to the relation between the package QoS indicator of the first service type of data and the package QoS indicator set (for example, whether the package QoS indicator of the first service type of data belongs to the set).

Figure 5:
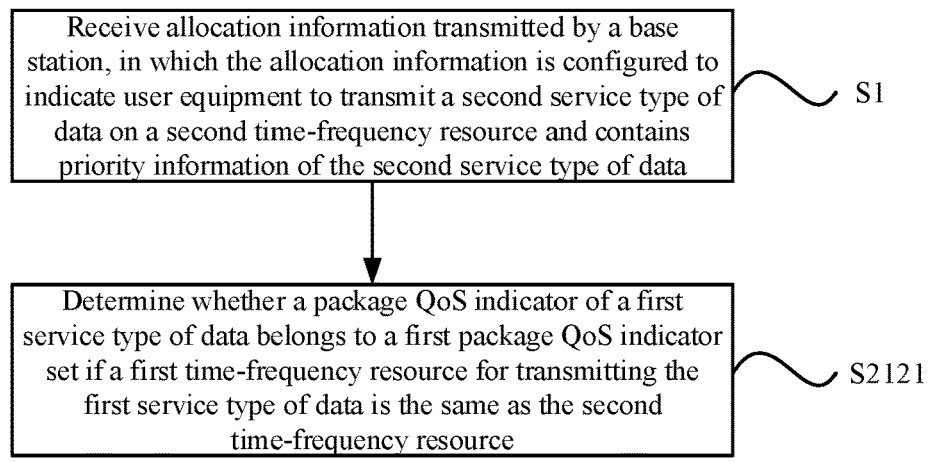
FIG. 5 is a schematic flowchart of yet another sidelink data transmission method shown according to an example of the disclosure.

FIG. 5 is a schematic flowchart of yet another sidelink data transmission method shown according to an example of the disclosure. As shown in FIG. 5, the priority information of the second service type of data contains a first package QoS indicator set (may be represented in a form of a table), and the step that relation between the priority of the first service type of data and the priority of the second service type of data is determined according to the relation between the package QoS indicator of the first service type of data and the package QoS indicator set includes:

in step S2121, whether the package QoS indicator of the first service type of data belongs to the first package QoS indicator set is determined.

It is determined that the priority of the first service type of data is higher that the priority of the second service type of data in response to the package QoS indicator of the first service type of data belonging to the first package QoS indicator set, and the priority of the second service type of data is higher than the priority of the first service type of data in response to the package QoS indicator of the first service type of data doing not belong to the first package QoS indicator set.

In one example, the first package QoS indicator set may be carried in the allocation information. The user equipment may determine which of the priority of the first service type of data and the priority of the second service type of data is higher according to whether the package QoS indicator of the first service type of data belongs to the first package QoS indicator set.

For example, it may be determined that the priority of the first service type of data is higher than the priority of the second service type of data in response to the package QoS indicator of the first service type of data belonging to the first package QoS indicator set. For example, it may be determined that the priority of the second service type of data is higher than the priority of the first service type of data in response to the package QoS indicator of the first service type of data doing not belong to the first package QoS indicator set.

Specifically, if the first time-frequency resource is the same as the second time-frequency resource, for example, the first package QoS indicator set contains three package QoS indicators, namely, 1, 2 and 4 respectively, the package QoS indicator of the first service type of data is 3, which does not belong to the first package QoS indicator set, then it may be determined that the priority of the second service type of data is higher than the priority of the first service type of data, and then the second service type of data may be transmitted on the first time-frequency resource.

In this way, the base station does not need to allocate priority information of different second service types of data respectively but only needs to set the relatively fixed first package QoS indicator set (may be changed as required but is relatively fixed relative to the second service type of data) in the allocation information, so that actions needing to be executed by the base station are reduced, and then resource consumption of the base station is reduced.

Figure 6:
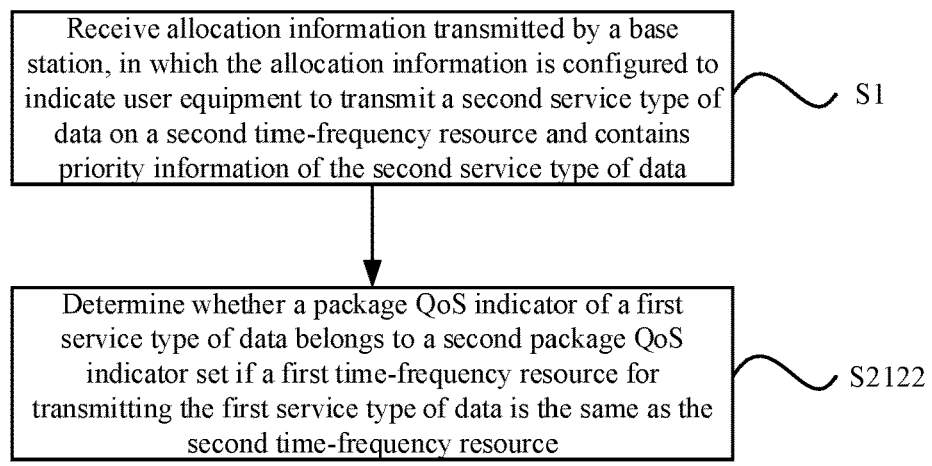
FIG. 6 is a schematic flowchart of yet another sidelink data transmission method shown according to an example of the disclosure.

FIG. 6 is a schematic flowchart of yet another sidelink data transmission method shown according to an example of the disclosure. As shown in FIG. 6, the priority information of the second service type of data contains a second package QoS indicator set (may be represented in a form of a table). The step that the relation between the priority of the first service type of data and the priority of the second service type of data is determined according to the relation between the package QoS indicator of the first service type of data and the package QoS indicator set includes:

in step S2122, whether the package QoS indicator of the first service type of data belongs to the second package QoS indicator set is determined.

It is determined that the priority of the first service type of data is higher than the priority of the second service type of data in response to the package QoS indicator of the first service type of data doing not belong to the second package QoS indicator set, and the priority of the second service type of data is higher than the priority of the first service type of data in response to the package QoS indicator of the first service type of data belonging to the second package QoS indicator set.

In one example, the second package QoS indicator set may be carried in the allocation information. The user equipment may determine which of the priority of the first service type of data and the priority of the second service type of data is higher according to whether the package QoS indicator of the first service type of data belongs to the second package QoS indicator set.

For example, it may be determined that the priority of the second service type of data is higher than the priority of the first service type of data in response to the package QoS indicator of the first service type of data belonging to the second package QoS indicator set. For example, it may be determined that the priority of the first service type of data is higher than the priority of the second service type of data in response to the package QoS indicator of the first service type of data doing not belong to the second package QoS indicator set.

Specifically, if the first time-frequency is the same as the second time-frequency resource, for example, the second package QoS indicator set contains three package QoS indicators, namely, 1, 2 and 4 respectively, the package QoS indicator of the first service type of data is 3, which does not belong to the second package QoS indicator set, then it may be determined that the priority of the first service type of data is higher than the priority of the second service type of data, and then the first service type of data may be transmitted on the first time-frequency resource.

In this way, the base station does not need to allocate priority information of different second service types of data respectively but only needs to set the relatively fixed second package QoS indicator set (may be changed as required but is relatively fixed relative to the second service type of data) in the allocation information, so that actions needing to be executed by the base station are reduced, and then resource consumption of the base station is reduced.

Figure 7:
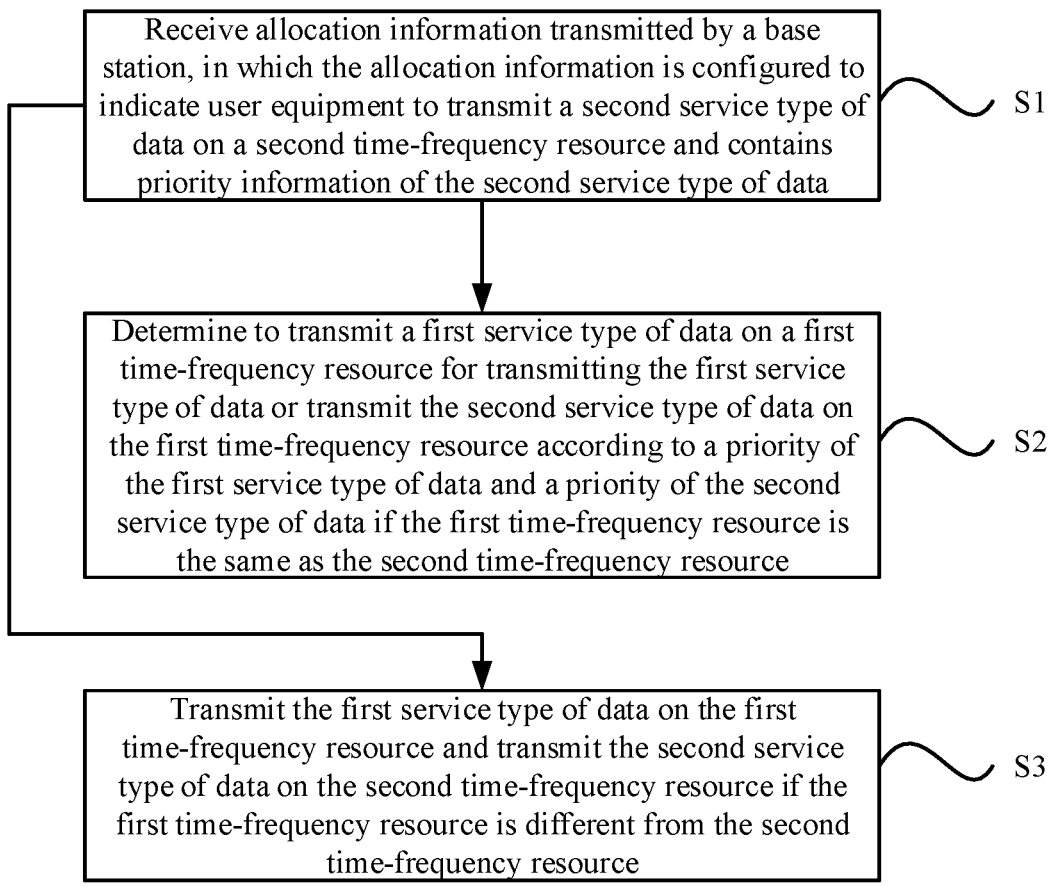
FIG. 7 is a schematic flowchart of yet another sidelink data transmission method shown according to an example of the disclosure.

FIG. 7 is a schematic flowchart of yet another sidelink data transmission method shown according to an example of the disclosure. As shown in FIG. 7, the method further includes:

in step S3, the first service type of data is transmitted on the first time-frequency resource and the second service type of data is transmitted on the second time-frequency resource if the first time-frequency resource is different from the second time-frequency resource.

In one example, the first time-frequency resource may be self-selected by the user equipment. For example, the base station may allocate a resource pool in advance or in real time for the user equipment, the resource pool may include one or more time-frequency resources, and the first time-frequency resource may be self-selected from the resource pool by the user equipment.

In one example, the first time-frequency resource may occupy one or more symbols or one or more subframes in the time domain, and occupy one or more subcarriers (or sub-bandwidths) in the frequency domain.

In one example, if the first tine-frequency resource for transmitting the first service type of data is different from the second time-frequency resource, the first service type of data may be transmitted on the first time-frequency resource, and the second service type of data may be transmitted on the second time-frequency resource, so that the first service type of data and the second service type of data may be transmitted respectively on the different time-frequency resources, it is guaranteed that the two service types of data can be transmitted smoothly, and the good communication effect of the user equipment is guaranteed.

For example, the first time-frequency resource occupies a sub-bandwidth 13 in the frequency domain and a subframe 3 in the time domain with a period being 10 milliseconds, then the second time-frequency resource determined by the base station is a time-frequency resource beyond the sub-bandwidth 13 and the subframe 3 in at least one period, so that the user equipment may transmit the first service type of data on the sub-bandwidth 13 and the subframe 3 and transmit the second service type of data beyond the sub-bandwidth 13 and the subframe 3 in at least one period.

Figure 8:
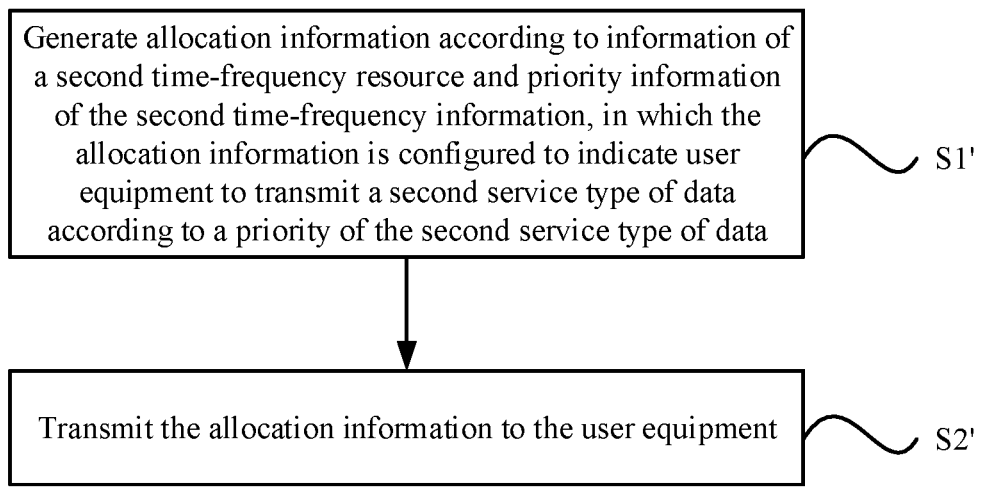
FIG. 8 is a schematic flowchart of a sidelink resource allocation method shown according to an example of the disclosure.

FIG. 8 is a schematic flowchart of a sidelink resource allocation method shown according to an example of the disclosure. The sidelink resource allocation method shown by the example of the disclosure may be suitable for a base station. The base station may perform communication with user equipment based on 5G NR. The user equipment may perform communication with other devices through a sidelink based on 5G NR. The other devices include other user equipment. The user equipment may be, for example, a mobile phone, a tablet PC, a wearable device and other electronic devices.

As shown in FIG. 8, the sidelink resource allocation method may include the following steps.

In step S1', allocation information is generated according to information of a second time-frequency resource and priority information of the second time-frequency resource. The allocation information is configured to indicate the user equipment to transmit a second service type of data according to a priority of the second service type of data.

In step S2', the allocation information is transmitted to the user equipment.

In one example, the base station indicates the user equipment to transmit the second service type of data according to the priority of the second service type of data through the allocation information, so that the user equipment may determine that a first service type of data is transmitted on a first time-frequency resource or the second service type of data is transmitted on the first time-frequency resource according to a priority of the first service type of data and the priority of the second service type of data if the first time-frequency resource is the same as the second time-frequency resource, a service type of data with a higher priority can be transmitted preferentially, and a good communication effect is guaranteed.

Optionally, the priority information of the second time-frequency resource includes a package QoS indicator of the second service type of data.

In one example, the priority of the second service type of data is represented as the package QoS indicator. As a package QoS indicator of the first service type of data may be self-determined by the user equipment, the user equipment may determine which of the priority of the first service type of data and the priority of the second service type of data is higher by comparing the package QoS indicator of the first service type of data with the package QoS indicator of the second service type of data.

Optionally, the priority information of the second service type of data contains a package QoS indicator set.

In one example, the package QoS indicator set may be carried in the allocation information. The user equipment may determine which of the priority of the first service type of data and the priority of the second service type of data is higher according to a relation between the package QoS indicator of the first service type of data and the package QoS indicator set (for example, whether the package QoS indicator of the first service type of data belongs to the set).

Optionally, the priority information of the second service type of data contains a first package QoS indicator set. The allocation information is configured to indicate the user equipment that a priority of a first service type of data corresponding to a package QoS indicator belonging to the first package QoS indicator set is higher than the priority of the second service type of data.

In one example, the base station may transmit the allocation information carrying the first package QoS indicator set all the time to the user equipment in a period of time, or the first package QoS indicator set may be carried in the allocation information only under the condition that it is determined that the first time-frequency resource is the same as the second time-frequency resource.

As the user equipment may self-determine priority information of the first service type of data, which of the priority of the first service type of data and the priority of the second service type of data is higher may be determined according to whether the package QoS indicator of the first service type of data belongs to the first package QoS indicator set if the first time-frequency resource is the same as the second time-frequency resource.

Optionally, the priority information of the second service type of data contains a second package QoS indicator set. The allocation information is configured to indicate the user equipment that a priority of a first service type of data corresponding to a package QoS indicator belonging to the second package QoS indicator set is lower than the priority of the second service type of data.

In one example, the base station may transmit the allocation information carrying the second package QoS indicator set all the time to the user equipment in a period of time, or the second package QoS indicator set may be carried in the allocation information only under the condition that it is determined that the first time-frequency resource is the same as the second time-frequency resource.

As the user equipment may self-determine the priority information of the first service type of data, which of the priority of the first service type of data and the priority of the second service type of data is higher may be determined according to whether the package QoS indicator of the first service type of data belongs to the second package QoS indicator set if the first time-frequency resource is the same as the second time-frequency resource.

The disclosure further discloses examples of a sidelink data transmission apparatus and a sidelink resource allocation apparatus corresponding to the above examples of the sidelink data transmission method and the sidelink resource allocation method.

Figure 9:
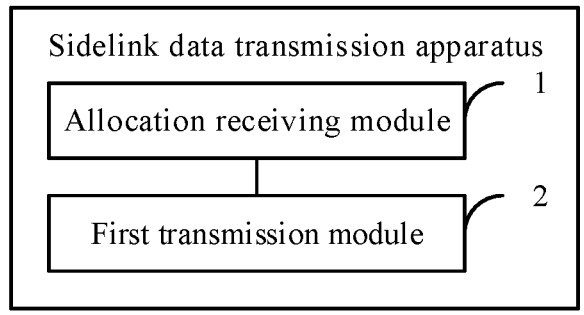
FIG. 9 is a schematic block diagram of a sidelink data transmission apparatus shown according to an example of the disclosure.

FIG. 9 is a schematic block diagram of a sidelink data transmission apparatus shown according to an example of the disclosure. The sidelink data transmission apparatus shown by the example of the disclosure may be suitable for user equipment. The user equipment may perform communication with other devices through a sidelink based on 5G NR. The other devices include a base station and also include other user equipment. The user equipment may be, for example, a mobile phone, a tablet PC, a wearable device and other electronic devices.

As shown in FIG. 9, the sidelink data transmission apparatus may include:

an allocation receiving module 1, configured to receive allocation information transmitted by the base station, in which the allocation information is configured to indicate the user equipment to transmit a second service type of data on a second time-frequency resource and contains priority information of the second service type of data; and a first transmission module 2, configured to determine to transmit a first service type of data on a first time-frequency resource for transmitting the first service type of data or transmit the second service type of data on the first time-frequency resource according to a priority of the first service type of data and the priority of the second service type of data if the first time-frequency resource is the same as the second time-frequency resource.

Figure 10:
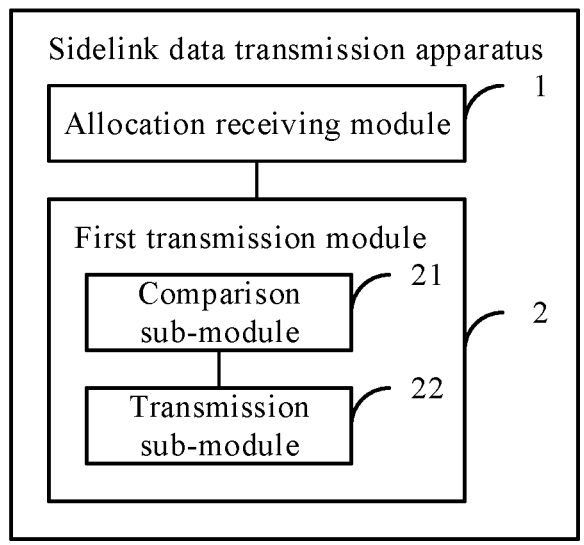
FIG. 10 is a schematic block diagram of another sidelink data transmission apparatus shown according to an example of the disclosure.

FIG. 10 is a schematic block diagram of another sidelink data transmission apparatus shown according to an example of the disclosure. As shown in FIG. 10, the first transmission module 2 includes:

a comparison sub-module 21, configured to compare the priority of the first service type of data with the priority of the second service type of data; and a transmission sub-module 22, configured to transmit the first service type of data on the first time-frequency resource in response to the priority of the first service type of data being higher than the priority of the second service type of data, and transmit the second service type of data on the first time-frequency resource in response to the priority of the second service type of data being higher than the priority of the first service type of data.

Optionally, a priority comparison module is configured to compare a package QoS indicator of the first service type of data with a package QoS indicator of the second service type of data.

Optionally, the priority information of the second service type of data contains a package QoS indicator set. The comparison sub-module is configured to determine a relation between the priority of the first service type of data and the priority of the second service type of data according to a relation between the package QoS indicator of the first service type of data and the package QoS indicator set.

Optionally, the priority information of the second service type of data contains a first package QoS indicator set. The comparison sub-module is configured to determine whether the package QoS indicator of the first service type of data belongs to the first package QoS indicator set.

It is determined that the priority of the first service type of data is higher than the priority of the second service type of data in response to the package QoS indicator of the first service type of data belonging to the second package QoS indicator set, and the priority of the second service type of data is higher than the priority of the first service type of data in response to the package QoS indicator of the first service type of data doing not belong to the second package QoS indicator set.

Optionally, the priority information of the second service type of data contains a second package QoS indicator set. The comparison sub-module is configured to determine whether the package QoS indicator of the first service type of data belongs to the second package QoS indicator set.

It is determined that the priority of the first service type of data is higher than the priority of the second service type of data in response to the package QoS indicator of the first service type of data doing not belong to the first package QoS indicator set, and the priority of the second service type of data is higher than the priority of the first service type of data in response to the package QoS indicator of the first service type of data belonging to the first package QoS indicator set.

Figure 11:
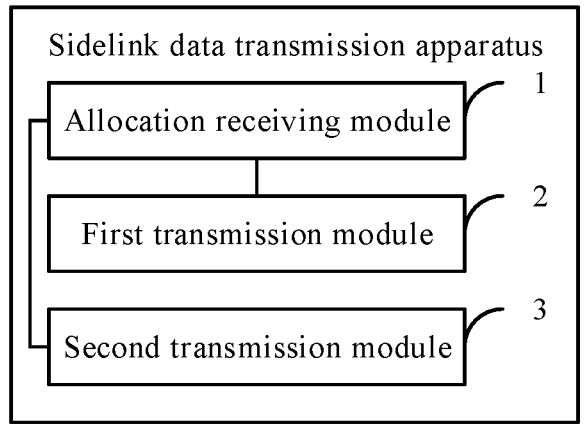
FIG. 11 is a schematic block diagram of yet another sidelink data transmission apparatus shown according to an example of the disclosure.

FIG. 11 is a schematic block diagram of yet another sidelink data transmission apparatus shown according to an example of the disclosure. As shown in FIG. 11, the apparatus further includes:

a second transmission module 3, configured to transmit the first service type of data on the first time-frequency resource for transmitting the first service type of data and transmit the second service type of data on the second time-frequency resource if the first time-frequency resource is different from the second time-frequency resource.

Figure 12:
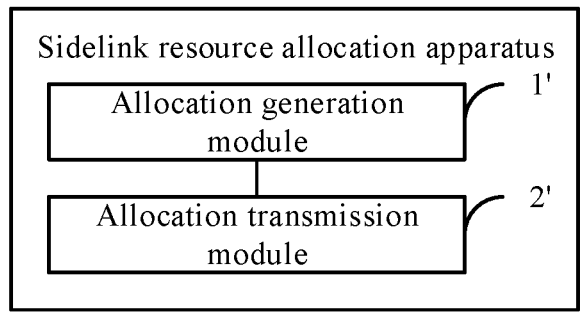
FIG. 12 is a schematic block diagram of a sidelink resource allocation apparatus shown according to an example of the disclosure.

FIG. 12 is a schematic block diagram of a sidelink resource allocation apparatus shown according to an example of the disclosure. The sidelink resource allocation apparatus shown by the example of the disclosure may be suitable for a base station. The base station may perform communication with user equipment based on 5G NR. The user equipment may perform communication with other devices through a sidelink based on 5G NR. The other devices include other user equipment. The user equipment may be, for example, a mobile phone, a tablet PC, a wearable device and other electronic devices.

As shown in FIG. 12, the sidelink resource allocation apparatus may include:

an allocation generation module 1', configured to generate allocation information according to information of a second time-frequency resource and priority information of the second time-frequency resource, in which the allocation information is configured to indicate the user equipment to transmit a second service type of data according to a priority of the second service type of data; and an allocation transmission module 2', configured to transmit the allocation information to the user equipment.

Optionally, the priority information of the second time-frequency resource includes a package QoS indicator of the second service type of data.

Optionally, the priority information of the second service type of data contains a package QoS indicator set.

Optionally, the priority information of the second service type of data contains a first package QoS indicator set. The allocation information is configured to indicate the user equipment that a priority of a first service type of data corresponding to a package QoS indicator belonging to the first package QoS indicator set is higher than the priority of the second service type of data.

Optionally, the priority information of the second service type of data contains a second package QoS indicator set. The allocation information is configured to indicate the user equipment that a priority of a first service type of data corresponding to a package QoS indicator belonging to the second package QoS indicator set is lower than the priority of the second service type of data.

As for the apparatuses in the examples, specific modes of executing operations by all the modules therein are already detailed in the examples of the related methods and will not be set forth in detail here.

As the apparatus examples basically correspond to the method examples, relevant portions may refer to the description of the method examples. The apparatus examples described above are only schematic, modules described as separated pars may be either physically separated or not physically separated, parts displayed as modules may be either physical modules or not physical modules, and may be located in one place or distributed onto a plurality of network modules. Part or all of the modules can be selected as actually required to realize the purpose of the solutions of the examples. Those ordinarily skilled in the art can understand and implement the solutions without creative work.

An example of the disclosure further provides an electronic device, including:

a processor; and a memory, configured to store instructions executable by the processor.

The processor is configured to implement the above sidelink data transmission method in any example.

An example of the disclosure further provides an electronic device, including:

a processor; and a memory, configured to store instructions executable by the processor.

The processor is configured to implement the above sidelink resource allocation method in any example.

An example of the disclosure further provides a computer readable storage medium storing a computer program. Steps of the above sidelink data transmission method in any example are realized when the program is executed by a processor.

An example of the disclosure further provides a computer readable storage medium storing a computer program. Steps of the above sidelink resource allocation method in any example are realized when the program is executed by a processor.

Figure 13:
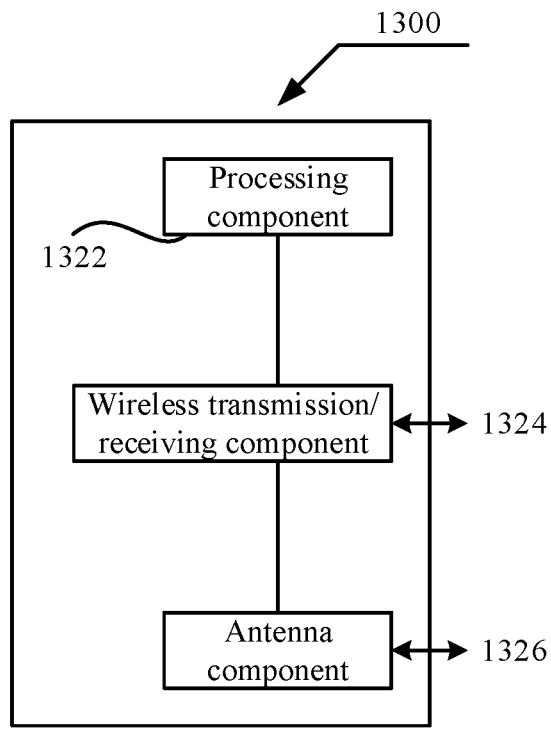
FIG. 13 is a schematic block diagram of an apparatus for sidelink resource allocation shown according to an example of the disclosure.

As shown in FIG. 13, a schematic block diagram of an apparatus 1300 for sidelink resource allocation shown according to an example of the disclosure. Referring to FIG. 13, the apparatus 1300 includes a processing component 1322, a wireless transmission/receiving component 1324, an antenna component 1326 and a signal processing portion which is special for a wireless interface. The processing component 1322 may further include one or more processors.

One processor in the processing component 1322 may be configured to implement the above sidelink resource allocation method in any example.

Figure 14:
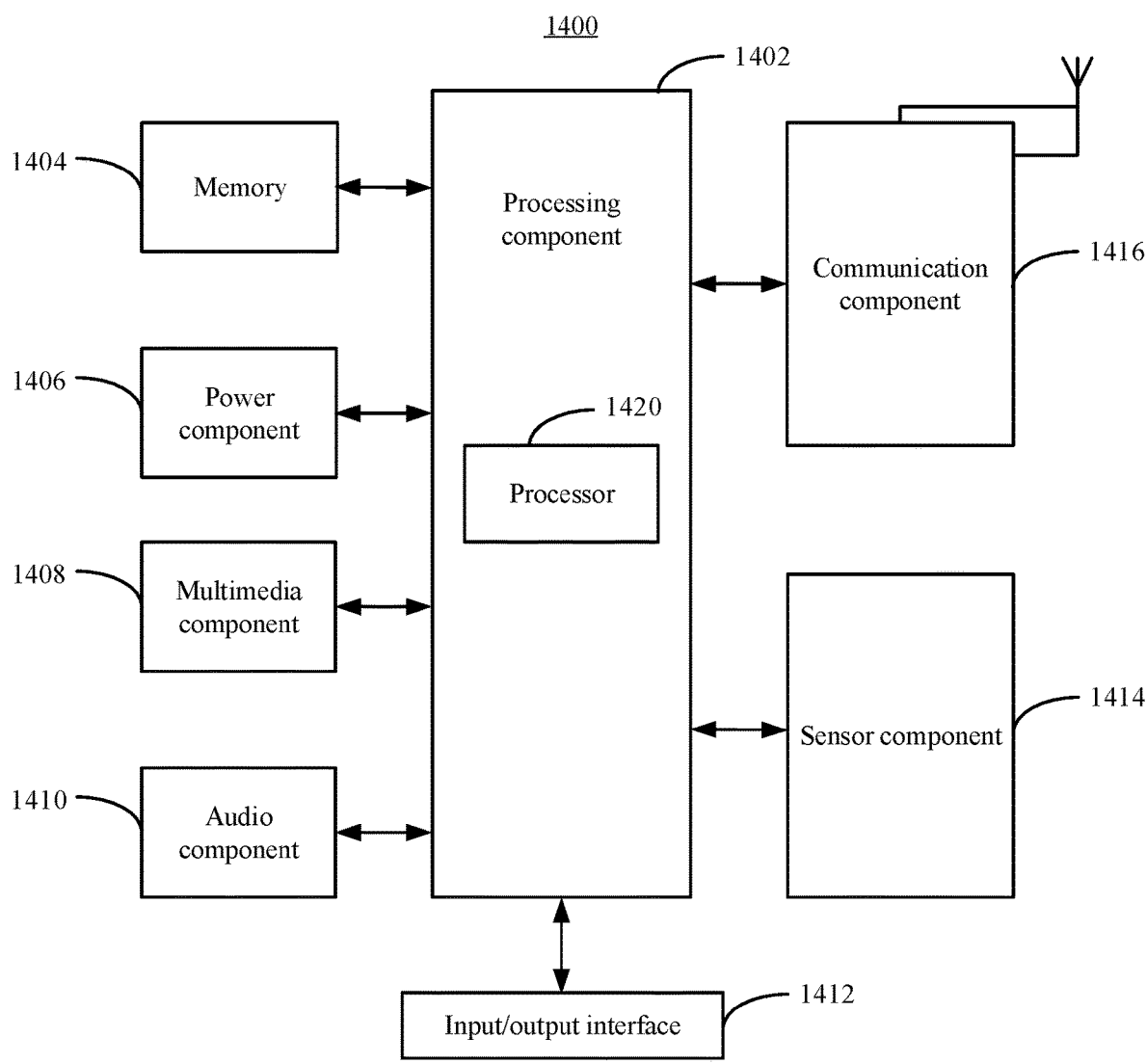
FIG. 14 is a schematic block diagram of an apparatus for sidelink data transmission shown according to an example of the disclosure.

FIG. 14 is a schematic block diagram of an apparatus 1400 for sidelink data transmission shown according to an example of the disclosure. For example, the apparatus 1400 may be a mobile phone, a computer, a digital broadcast terminal, a messaging device, a game console, a tablet device, a medical device, a fitness device, a personal digital assistant and the like.

Referring to FIG. 14, the apparatus 1400 may include one or more components as follows: a processing component 1402, a memory 1404, a power component 1406, a multimedia component 1408, an audio component 1410, an input/output (I/O) interface 1412, a sensor component 1414 and a communication component 1416.

The processing component 1402 usually controls whole operations of the apparatus 1400, such as operations related to display, phone call, data communication, camera operation and recording operation. The processing component 1402 may include one or more processors 1420 for executing instructions so as to complete all or part of the steps of the above method. Besides, the processing component 1402 may include one or more modules so as to facilitate interaction between the processing component 1402 and the other components. For example, the processing component 1402 may include a multimedia module so as to facilitate interaction between the multimedia component 1408 and the processing component 1402.

The memory 1404 is configured to store various data so as to support operation on the apparatus 1400. Examples of these data include instructions of any application program or method operated on the apparatus 1400, contact person data, telephone directory data, messages, pictures, videos and the like. The memory 1404 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 1406 provides power for various components of the apparatus 1400. The power component 1406 may include a power management system, one or more power sources and other components related to power generation, management and distribution for the apparatus 1400.

The multimedia component 1408 includes a screen for providing an output interface between the apparatus 1400 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensors can not only sense a boundary of a touching or swiping action but also detect a duration and a pressure relevant to the touching or swiping operation. In some examples, the multimedia component 1408 includes a front camera and/or a rear camera. When the apparatus 1400 is in an operation mode, such as a shooting mode or a video mode, the front camera and/or the rear camera may receive multimedia data from the outside. Each front camera and each rear camera may be a fixed optical lens system or have focal length and an optical zooming capability.

The audio component 1410 is configured to output and/or input an audio signal. For example, the audio component 1410 includes a microphone (MIC). When the apparatus 1400 is in the operation mode, such as a call mode, a recording mode and a voice recognition mode, the microphone is configured to receive an external audio signal. The received audio signal may be further stored in the memory 1404 or transmitted through the communication component 1416. In some examples, the audio component 1410 may include a loudspeaker configured to output the audio signal.

The I/O interface 1412 provides an interface between the processing component 1402 and a peripheral interface module. The peripheral interface module may be a keyboard, a click wheel, buttons and the like. These button may include but are not limited to: a home button, a volume button, a start button and a lock button.

The sensor component 1414 includes one or more sensors, configured to provide state evaluations of all aspects for the apparatus 1400. For example, the sensor component 1414 may detect a start/shutdown state of the apparatus 1400, and relative positioning of components, for example, the components are a display and a keypad of the apparatus 1400. The sensor component 1400 may further detect position change of the apparatus 1400 or one component of the apparatus 1400, whether the user makes contact with the apparatus 1400, azimuth or acceleration/deceleration of the apparatus 1400 and temperature change of the apparatus 1400. The sensor component 1414 may include a proximity sensor, configured to detect existence of an object nearby without any physical contact. The sensor component 1414 may further include an optical sensor, such as a CMOS or CCD image sensor, configured to be used in image application. In some examples, the sensor component 1414 may further include an acceleration sensor, a gyroscope sensor, a magnetic sensor, a pressure sensor or a temperature sensor.

The communication component 1416 is configured to facilitate wired or wireless communication between the apparatus 1400 and other devices. The apparatus 1400 may access to a wireless network based on a communication standard, such as WiFi, 2G or 3G, 4G LTE, 5G NR or their combination. In an example, the communication component 1416 receives a broadcast signal or related broadcast information from an external broadcast management system through a broadcast channel. In an example, the communication component 1416 may further include a near-field communication (NFC) module so as to facilitate short-distance communication. For example, the NFC module may be realized on the basis of a radio frequency identification (RFID) technology, an infrared data association (IrDA) technology, an ultra wide band (UWB) technology, a Bluetooth (BT) technology and other technologies.

In the example, the apparatus 1400 may be realized by one or more application specific integrated circuits (ASICs), a digital signal processor (DSP), a digital signal processing device (DSPD), a programmable logic device (PLD), a field-programmable gate array (FPGA), a controller, a micro-controller, a micro-processor or other electronic elements for executing the above sidelink data transmission method in any example.

The example further provides a non-temporary computer readable storage medium including instructions, for example, a memory 1404 including instructions. The instructions may be executed by a processor 1420 of the apparatus 1400 to complete the above sidelink data transmission method. For example, the non-temporary computer readable storage medium may be the ROM, a random access memory (RAM), a CD-ROM, a magnetic tape, a floppy disk, an optical data storage device and the like.

Those skilled in the art will easily figure out other implementation solutions of the disclosure after considering the specification and practising the disclosure disclosed herein. The disclosure intends to cover any modification, application or adaptive change of the disclosure, which conform to a general principle of the disclosure and include general common knowledge or conventional technical means not disclosed herein in the technical field. The specification and the examples are constructed as only exemplary, and the true scope and spirit of the disclosure are indicated by the following claims.

It should be understood that the disclosure is not limited to an accurate structure already described above and shown in the drawings and allow various modifications and changes without departing from its scope. The scope of the disclosure is limited only by the appended claims.

It needs to be noted that relation terms such as 'first' and 'second' herein are only used for distinguishing one entity or operation from another entity or operation rather than necessarily require or imply that any actual relation or sequence exist between these entities or operations. Terms 'include', 'contain' or any other variants of them intend to cover non-exclusive containing, so that a process, a method, an item or a device including a series of elements include not only those elements but also other elements not listed clearly or further include inherent elements of the process, the method, the item or the device. Without more limits, elements limited by a statement 'including a . . . ' does not exclude a situation that other same elements further exist in the process, the method, the item or the devices including the elements.

The method and the apparatus provided by the examples of the disclosure are introduced in detail above. A principle and implementations of the disclosure are set forth by using specific examples herein. Description of the above examples is only used for helping to understand the method and a core concept of the disclosure. Meanwhile, those ordinarily skilled in the art can make changes to the specific implementations and the application range according to the concept of the disclosure. To sum up, the contents of the specification are not supposed to be constructed as limit on the disclosure.

What is claimed is:

1. A method for sidelink data transmission, suitable for user equipment and comprising:
   receiving allocation information transmitted by a base station, wherein the allocation information instructs the user equipment to transmit a second service type of data on a second time-frequency resource and comprises priority information of the second service type of data; and
   determining to transmit a first service type of data on a first time-frequency resource or transmit the second service type of data on the first time-frequency resource according to a priority of the first service type of data and a priority of the second service type of data if the first time-frequency resource is the same as the second time-frequency resource, wherein the first time-frequency resource is used for transmitting the first service type of data;
   wherein determining to transmit the first service type of data on the first time-frequency resource or transmit the second service type of data on the first time-frequency resource according to the priority of the first service type of data and the priority of the second service type of data comprises:
      comparing the priority of the first service type of data with the priority of the second service type of data; and
      transmitting the first service type of data on the first time-frequency resource in response to the priority of the first service type of data being higher than the priority of the second service type of data, and transmitting the second service type of data on the first time-frequency resource in response to the priority of the second service type of data being higher than the priority of the first service type of data;
   wherein the priority information of the second service type of data comprises a first package QoS indicator set, the priority of the first service type of data is determined to be higher than the priority of the second service type of data in response to the package QoS indicator of the first service type of data belonging to the first package QoS indicator set, and the priority of the second service type of data is determined to be higher than the priority of the first service type of data in response to the package QoS indicator of the first service type of data doing not belong to the first package QoS indicator set;
   or the priority information of the second service type of data comprises a second package QoS indicator set, the priority of the first service type of data is determined to be higher than the priority of the second service type of data in response to the package QoS indicator of the first service type of data doing not belong to the second package QoS indicator set, and the priority of the second service type of data is determined to be higher than the priority of the first service type of data in response to the package QoS indicator of the first service type of data belonging to the second package QoS indicator set.

2. The method according to claim 1, further comprising:
   transmitting the first service type of data on the first time-frequency resource and transmitting the second service type of data on the second time-frequency resource if the first time-frequency resource is different from the second time-frequency resource.

3. A method for sidelink resource allocation, suitable for a base station and comprising:
   generating allocation information according to information of a second time-frequency resource and priority information of the second time-frequency resource, wherein the allocation information instructs user equipment to transmit a second service type of data on the second time-frequency resource or transmit the second service type of data according to a priority of the second service type of data; and
   transmitting the allocation information to the user equipment;
   wherein the first service type of data is transmitted on the first time-frequency resource in response to the priority of the first service type of data being higher than the priority of the second service type of data, and the second service type of data is transmitted on the first time-frequency resource in response to the priority of the second service type of data being higher than the priority of the first service type of data;

wherein the priority information of the second service type of data comprises a first package QoS indicator set, the priority of the first service type of data is determined to be higher than the priority of the second service type of data in response to the package QoS indicator of the first service type of data belonging to the first package QoS indicator set, and the priority of the second service type of data is determined to be higher than the priority of the first service type of data in response to the package QoS indicator of the first service type of data doing not belong to the first package QoS indicator set;

or the priority information of the second service type of data comprises a second package QoS indicator set, the priority of the first service type of data is determined to be higher than the priority of the second service type of data in response to the package QoS indicator of the first service type of data doing not belong to the second package QoS indicator set, and the priority of the second service type of data is determined to be higher than the priority of the first service type of data in response to the package QoS indicator of the first service type of data belonging to the second package QoS indicator set.

4. An electronic device, comprising:
one or more processors; and
a non-transitory computer-readable storage medium for storing instructions executable by the one or more processors, wherein the one or more processors are configured to:
receive allocation information transmitted by a base station, wherein the allocation information instructs the user equipment to transmit a second service type of data on a second time-frequency resource and comprises priority information of the second service type of data; and
determine to transmit a first service type of data on a first time-frequency resource or transmit the second service type of data on the first time-frequency resource according to a priority of the first service type of data and a priority of the second service type of data if the first time-frequency resource is the same as the second time-frequency resource, wherein the first time-frequency resource is used for transmitting the first service type of data;
wherein the processor is further configured to:
compare the priority of the first service type of data with the priority of the second service type of data; and
transmit the first service type of data on the first time-frequency resource in response to the priority of the first service type of data being higher than the priority of the second service type of data, and transmit the second service type of data on the first time-frequency resource in response to the priority of the second service type of data being higher than the priority of the first service type of data;

wherein the priority information of the second service type of data contains a first package QoS indicator set, and the processor is further configured to determine whether the package QoS indicator of the first service type of data belongs to the first package QoS indicator set; determine that the priority of the first service type of data is higher than the priority of the second service type of data in response to the package QoS indicator of the first service type of data belonging to the first package QoS indicator set, and determine that the priority of the second service type of data is higher than the priority of the first service type of data in response to the package QoS indicator of the first service type of data doing not belong to the first package QoS indicator set;

or the priority information of the second service type of data contains a second package QoS indicator set, and the processor is further configured to determine whether the package QoS indicator of the first service type of data belongs to the second package QoS indicator set; determine that the priority of the first service type of data is higher than the priority of the second service type of data in response to the package QoS indicator of the first service type of data doing not belong to the second package QoS indicator set, and determine that the priority of the second service type of data is higher than the priority of the first service type of data in response to the package QoS indicator of the first service type of data belonging to the second package QoS indicator set.

5. An electronic device, comprising:
one or more processors; and
a non-transitory computer-readable storage medium for storing instructions executable by the one or more processors, wherein the one or more processors are configured to implement the method of claim 3.

6. A non-transitory computer readable storage medium, storing a computer-executable instructions that, when executed by one or more computer processors, causing the one or more computer processors to perform the method according to claim 1.

7. A non-transitory computer readable storage medium, storing a computer-executable instructions that, when executed by one or more computer processors, causing the one or more computer processors to perform the method according to claim 3.

* * * * *